United States Patent
Hales et al.

(10) Patent No.: US 10,077,068 B2
(45) Date of Patent: Sep. 18, 2018

(54) INERTIA COMPENSATION FREQUENCY SHAPING FOR IMPROVED EPS SYSTEM STABILITY

(71) Applicant: Steering Solutions IP Holding Corporation, Saginaw, MI (US)

(72) Inventors: Michael K. Hales, Midland, MI (US); Tejas M. Varunjikar, Saginaw, MI (US); Shrenik P. Shah, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 254 days.

(21) Appl. No.: 14/953,289

(22) Filed: Nov. 27, 2015

(65) Prior Publication Data
US 2017/0029019 A1 Feb. 2, 2017

Related U.S. Application Data

(60) Provisional application No. 62/199,457, filed on Jul. 31, 2015.

(51) Int. Cl.
*B62D 5/04* (2006.01)
*B62D 6/00* (2006.01)
*G07C 5/02* (2006.01)

(52) U.S. Cl.
CPC ......... *B62D 5/0463* (2013.01); *B62D 6/008* (2013.01); *G07C 5/02* (2013.01)

(58) Field of Classification Search
None
See application file for complete search history.

(56) References Cited

U.S. PATENT DOCUMENTS

| 5,668,722 A * | 9/1997 | Kaufmann ........... B62D 5/0466 |
| | | 180/446 |
| 5,668,772 A * | 9/1997 | Hotta ....................... G11C 8/10 |
| | | 365/230.06 |
| 5,979,587 A * | 11/1999 | Liubakka ............. B62D 5/0463 |
| | | 180/446 |
| 8,996,250 B2 | 3/2015 | Hales et al. |
| 2005/0103561 A1 * | 5/2005 | Endo ............................. 180/443 |

(Continued)

FOREIGN PATENT DOCUMENTS

| CN | 1749081 A | 3/2006 |
| CN | 101811515 A | 8/2010 |

(Continued)

OTHER PUBLICATIONS

OA, dated Aug. 6, 2018, Office Action in English.
OA, dated Aug. 6, 2018, Search Report in English.

*Primary Examiner* — Shelly Chen
(74) *Attorney, Agent, or Firm* — Cantor Colburn LLP

(57) ABSTRACT

A control system for a power steering system includes a motor; a control module in communication with the motor, the control module providing a compensated velocity loop command to the motor. The control module includes a stability compensation filter module that receives a vehicle speed and a velocity loop command, the stability compensation filter applies a second order filter on the velocity loop command to generate the compensated velocity loop command used by the motor.

20 Claims, 6 Drawing Sheets

(56) References Cited

U.S. PATENT DOCUMENTS

| | | | |
|---|---|---|---|
| 2007/0198153 A1* | 8/2007 | Oya | 701/41 |
| 2007/0205041 A1* | 9/2007 | Nishizaki | B62D 5/0472 |
| | | | 180/446 |
| 2011/0054737 A1* | 3/2011 | Naik | B62D 5/0463 |
| | | | 701/41 |
| 2013/0066520 A1* | 3/2013 | Hales | B62D 5/0463 |
| | | | 701/41 |
| 2014/0058630 A1* | 2/2014 | Kezobo | B62D 5/0472 |
| | | | 701/42 |
| 2015/0372623 A1* | 12/2015 | Pramod | H02P 6/08 |
| | | | 318/400.02 |
| 2017/0217484 A1* | 8/2017 | Toda | B62D 6/00 |

FOREIGN PATENT DOCUMENTS

| | | |
|---|---|---|
| CN | 103562049 A | 2/2014 |
| EP | 2716522 A1 | 4/2014 |
| JP | 2008049937 A | 3/2008 |
| JP | 2014031103 A | 2/2014 |

* cited by examiner

US 10,077,068 B2

INERTIA COMPENSATION FREQUENCY SHAPING FOR IMPROVED EPS SYSTEM STABILITY

CROSS-REFERENCE TO RELATED APPLICATION

This patent application claims priority to U.S. Provisional Patent Application Ser. No. 62/199,457, filed Jul. 31, 2015, which is incorporated herein by reference in its entirety.

BACKGROUND OF THE INVENTION

An electric power steering system (EPS) measures signals including torsion bar torque and motor velocity. These signals may be used to devise control algorithms and an architecture that provide desired steering feel, while maintaining system stability. FIG. 1 illustrates an EPS control architecture 20 consisting of two control loops, a torque loop based mainly on measured torque, and a velocity loop mainly based on measured motor velocity. In practical application, both loops may use other EPS and vehicle signals such as assist command, vehicle speed etc. A velocity controller 22 controls the velocity loop and a torque controller 24 controls a torque loop. The velocity controller 22 provides a part of motor torque signal for a motor of the electric power steering system 30, and the torque controller 24 provides motor torque signal for the motor. The motor velocity signal and the motor torque signal are joined at summation block 28, and a summed signal is provided to the motor of the electric power steering system 30. The motor represents motor control architecture as well as electric motor dynamics. The motor generates a torque command that acts on components within the electric power steering system 30.

Frequency-dependent damping, motor velocity damping and inertia compensation are examples of the functions that act primarily in the velocity loop. Inertia compensation, for example, may compensate for the motor inertia, but higher gains may lead to a decrease in the stability margins of the steering system.

SUMMARY OF THE INVENTION

According to one embodiment of the invention, a control system for a power steering system comprises a motor, a control module in communication with the motor, the control module providing a compensated velocity loop command to the motor, the control module including a stability compensation filter module that receives a vehicle speed and a velocity loop command, the stability compensation filter applies a second order filter on the velocity loop command to generate the compensated velocity loop command used by the motor.

Accordingly to another embodiment of the invention, a method for controlling a power steering system comprises receiving a vehicle speed and velocity loop command that indicates a velocity of a motor, filtering the velocity loop command with a second order filter, and generating a compensated velocity loop command used by the motor based on the filtered velocity loop command.

According to one embodiment of the invention, a control system for a power steering system comprises a motor, a control module in communication with the motor, the control module providing a compensated velocity loop command to the motor, the control module including a stability compensation filter module that receives a vehicle speed and a velocity loop command, the stability compensation filter applies a second order filter on the velocity loop command to generate the compensated velocity loop command used by the motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 2:
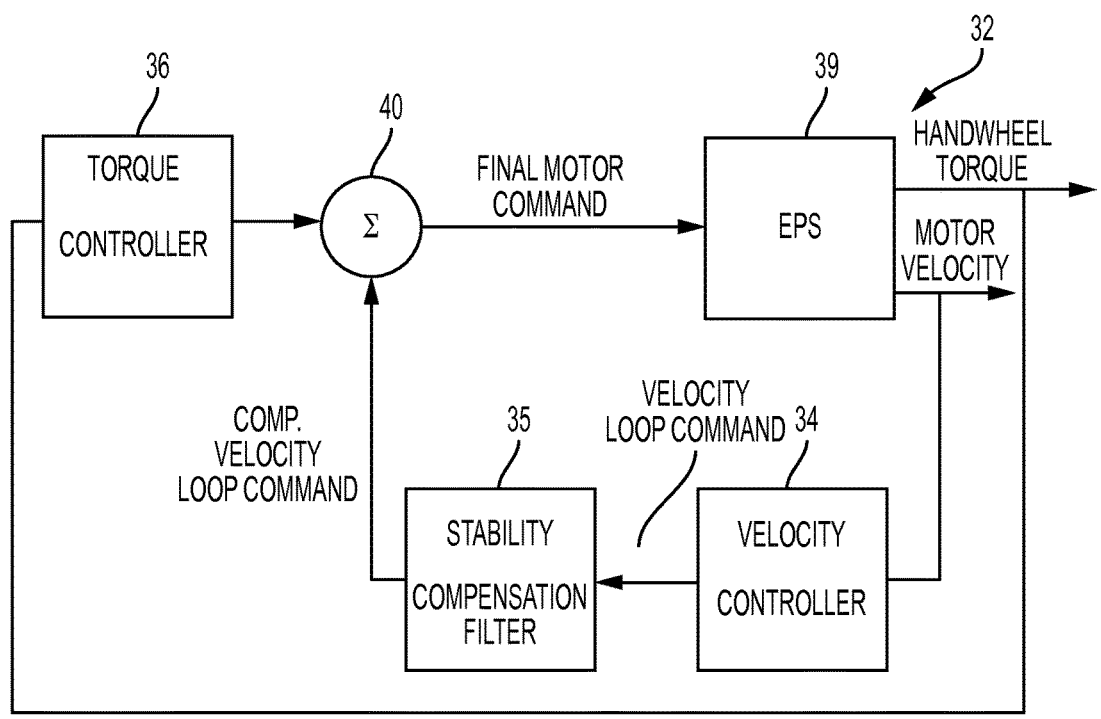
FIG. 2 is a block diagram of an electric power steering control architecture in accordance with one embodiment of the invention.

Referring now to the FIGS. 2-6, where the invention will be described with reference to specific embodiments, without limiting same, FIG. 2 is a block diagram of a control system of an EPS system in accordance with one embodiment of the invention. The EPS control architecture 32 has two control loops, a torque loop that provides a measured torque, and a velocity loop that provides a measured motor velocity. A velocity controller 34 controls the velocity loop and a torque controller 36 controls a torque loop. The velocity controller 34 receives a motor velocity signal and provides a velocity loop command to a stability compensation filter 35. The stability compensation filter 35 provides a compensated velocity loop command for a motor of the electric power steering system 39. The torque controller 36 provides a motor torque signal for the motor of the electric power steering system 39. The motor velocity signal and the motor torque signal are joined at summation block 40, where a summed signal representative of a final motor command is provided to the motor. The motor of the electric power steering system 39 generates a torque command that is applied within the electric power steering system 39.

Figure 1:
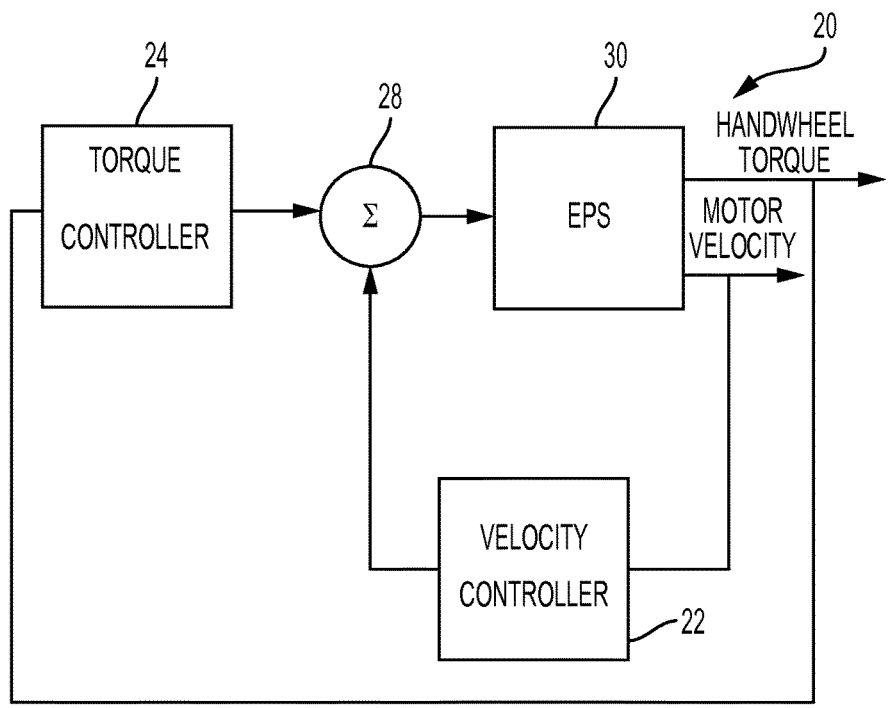
FIG. 1 is a block diagram of an electric power steering control architecture.
Figure 3:
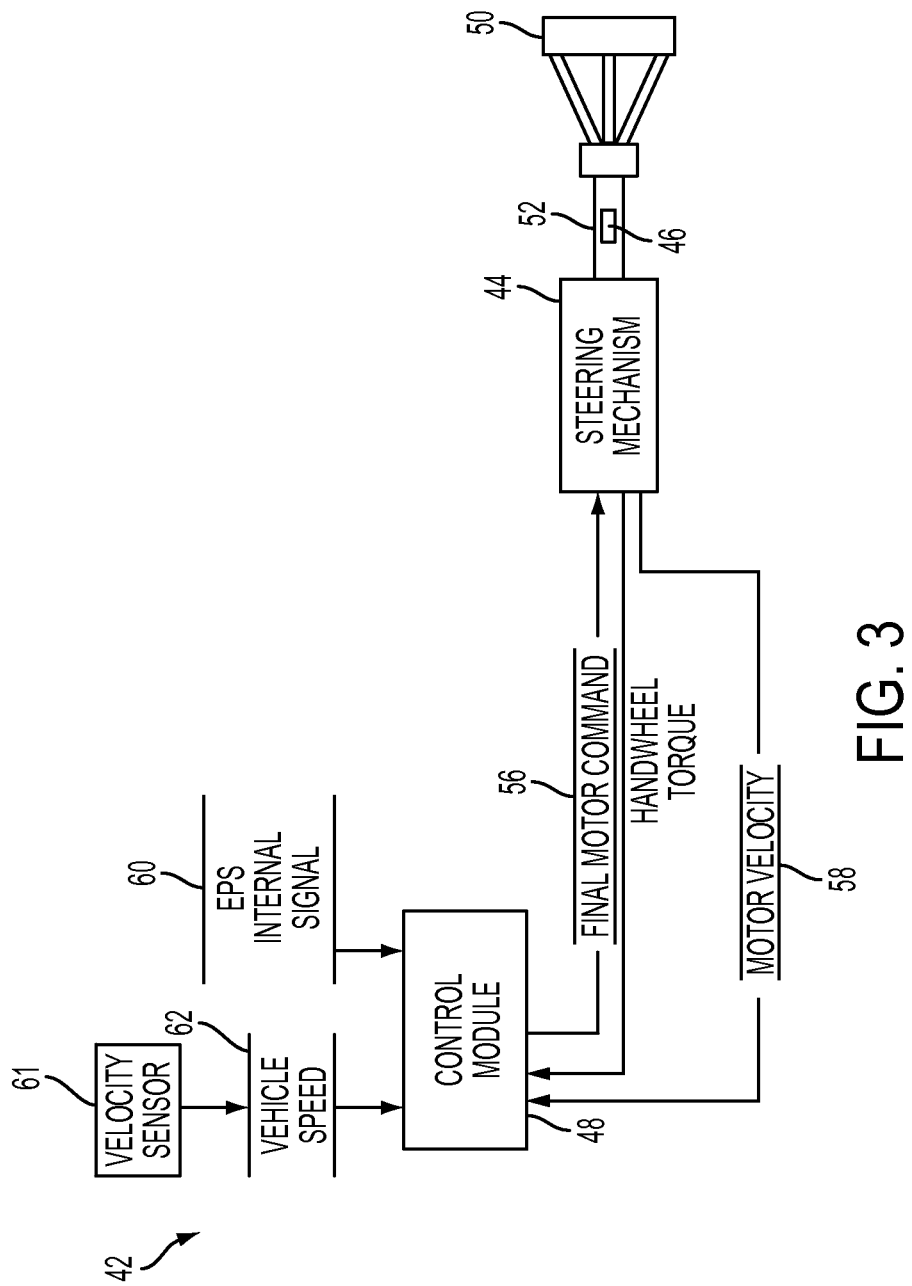
FIG. 3 is a block diagram of an electric power steering control system in accordance with one embodiment of the invention.

FIG. 3 is a schematic illustration of an exemplary power electric steering system 42, including a final motor command 56. The power steering system 42 includes a steering mechanism 44, a torque sensor 46, and a control module 48. In some embodiments, the steering mechanism 44 includes a motor (not shown). In the embodiment as shown in FIG. 1, the control module 48 is in communication with the steering mechanism 44, and the torque sensor 46. The motor may be an electric motor for providing torque assist within the steering mechanism 44. The steering mechanism 44 may include a handwheel 50 that is coupled to an upper steering shaft 52. In one embodiment, the power steering system 42 may be part of a vehicle (not shown) where the torque sensor 46 detects an amount of torque exerted on the handwheel 50 by a driver. The control module 48 may receive a vehicle speed 62 from a velocity sensor 53, for example.

Figure 4A:
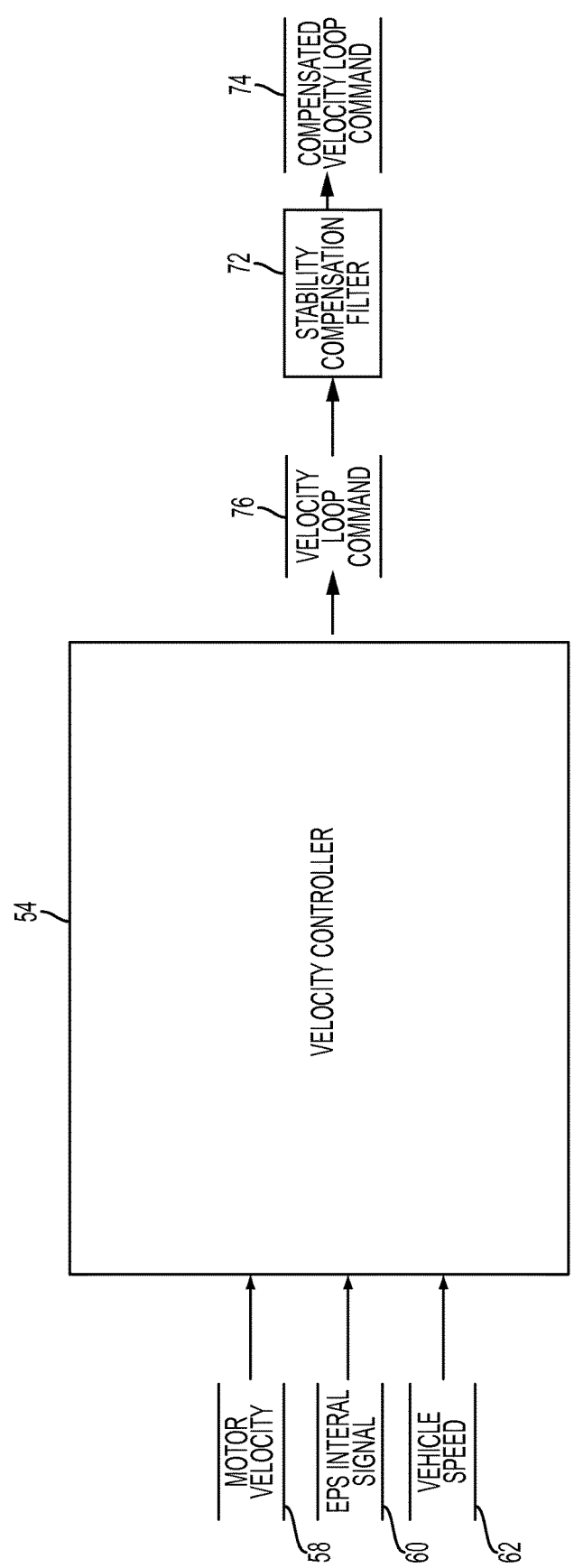
FIG. 4A is a dataflow diagram illustrating a general implementation of the velocity loop of the electric power steering control system in accordance with one embodiment of the invention.

Referring now to FIG. 4A with continuing reference to FIG. 3, a dataflow diagram illustrates an exemplary embodiment of a velocity controller 54 included with the control module 48 used to control the power steering system 42. In FIG. 4A, the velocity controller 54 is a component of control module 48. However, it is to be appreciated that the velocity controller 54 may be a separate component apart from the control module 48, or that the velocity controller 54 may include different modules that the embodiment shown in FIG. 4A.

In various embodiments, the control module 48 and the velocity controller 54 may include one or more sub-modules and datastores. As used herein the terms module and sub-module refer to an application specific integrated circuit (ASIC), an electronic circuit, a processor (shared, dedicated, or group) and memory that executes one or more software or firmware programs, or a combinational logic circuit. As can be appreciated, the sub-modules shown in FIGS. 3, 4A and 4B can be combined and/or further partitioned. Inputs to the control module 48 and the velocity controller 54 may be generated from the motor 38, the steering mechanism 44, the torque sensor 38, from other control modules (not shown), may be modeled, and/or may be predefined.

FIG. 4A is an implementation of a velocity controller 54 in accordance with one embodiment of the disclosure. In operation, the velocity controller 54 receives as inputs the motor velocity 58, at least one EPS internal signal 60, and a vehicle speed 62. The EPS internal signal can be one or more signals, including but not limited to handwheel torque, base assist command, etc. The velocity controller 54 processes these inputs to generate a velocity loop command. The velocity loop command is sent to a stability compensation filter 72. As described in more detail below, the stability compensation filter 72 is used to determine a compensated velocity loop command 74 that is ultimately provided to the motor of the steering mechanism 44 (FIG. 3).

Figure 4B:
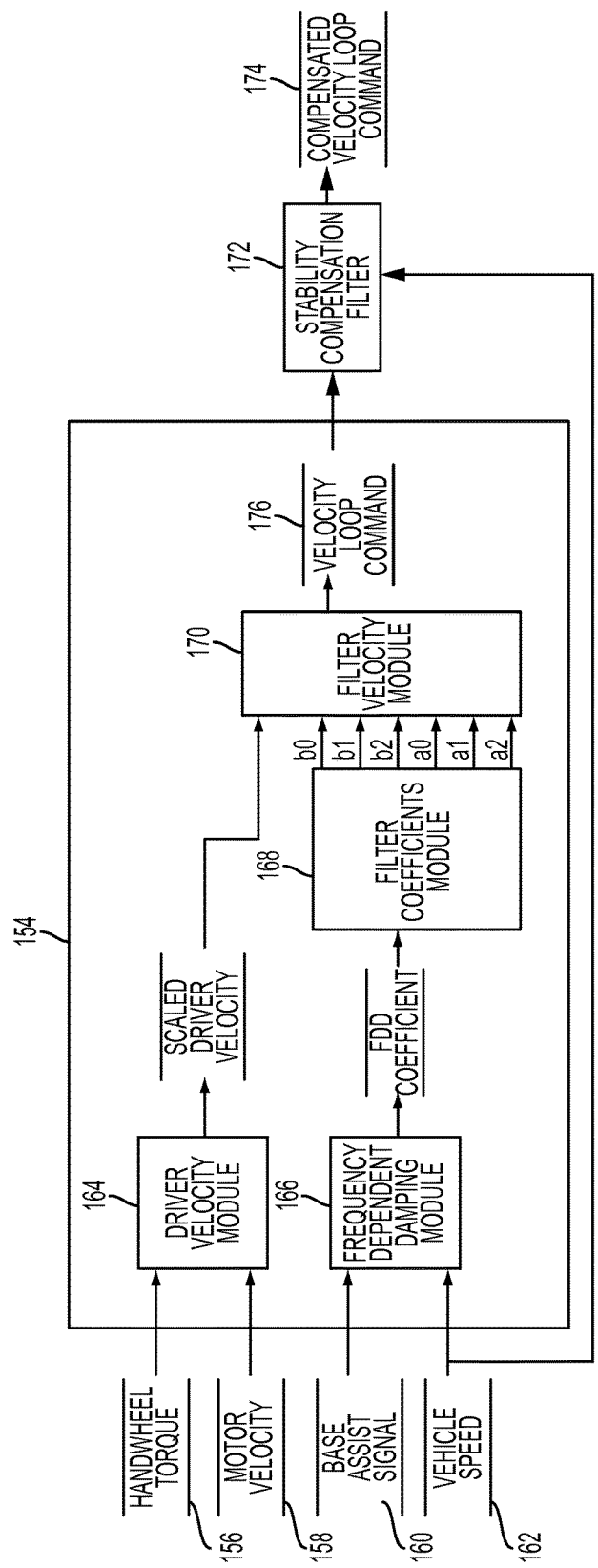
FIG. 4B is a dataflow diagram illustrating a specific implementation of the velocity loop of the electric power steering control system in accordance with another embodiment of the invention.

FIG. 4B is one embodiment of the velocity controller as applied to inertia compensation. With continuing reference to FIGS. 3 and 4B, the velocity controller 154 receives as inputs a handwheel torque 156, a motor velocity 158, abase assist signal 160 generated within the control module 48, and a vehicle speed 162. The handwheel torque 156 may be monitored by the torque sensor 46 shown in FIG. 3. The motor velocity 158 is based on the velocity of the motor. The base assist signal 160 may represent the handwheel torque multiplied with a vehicle speed dependent assist gain as described for example in U.S. Pat. No. 8,996,250, which is incorporated by reference herein. The velocity controller 154 may include a driver velocity module 164, a frequency dependent damping (FDD) module 166, a filter coefficient module 168 and a filter velocity module 170. In this embodiment, the filter velocity module 170 generates a velocity loop command 176. In this embodiment, the velocity loop command 176 may represent an inertia compensation command, which compensates for inertia of the motor related to changes in motion of a handwheel, for example. The stability compensation filter module 172, which may be a module of the velocity controller 154 or a module apart from the velocity controller 154, receives the velocity loop command 176 in this embodiment. It is to be appreciated that the stability compensation filter 172 can be applied to any velocity loop or velocity controller, and is not limited to the embodiment shown. The stability compensation filter 172 is used to determine a compensated velocity loop command 174 that is ultimately provided to the motor.

In one embodiment, the stability compensation filter module 172 receives as inputs the vehicle speed 162, and the velocity loop command 176 produced by the filter velocity module 154. The stability compensation filter module 172 determines a compensated velocity loop command 174 based on these inputs. A torque-signal based motor torque can be compensated using a stability filter in an EPS system such as the system detailed in U.S. Pat. No. 5,668,722, which is herein incorporated by reference. Tuning motor velocity based command modules in a velocity loop of the EPS system (without using any stability compensation filter) may cause decrease in stability margins. The stability compensation filter 172 may maintain EPS stability margins while maintaining steering feel and compensating for inertia within the EPS system.

Figure 5:
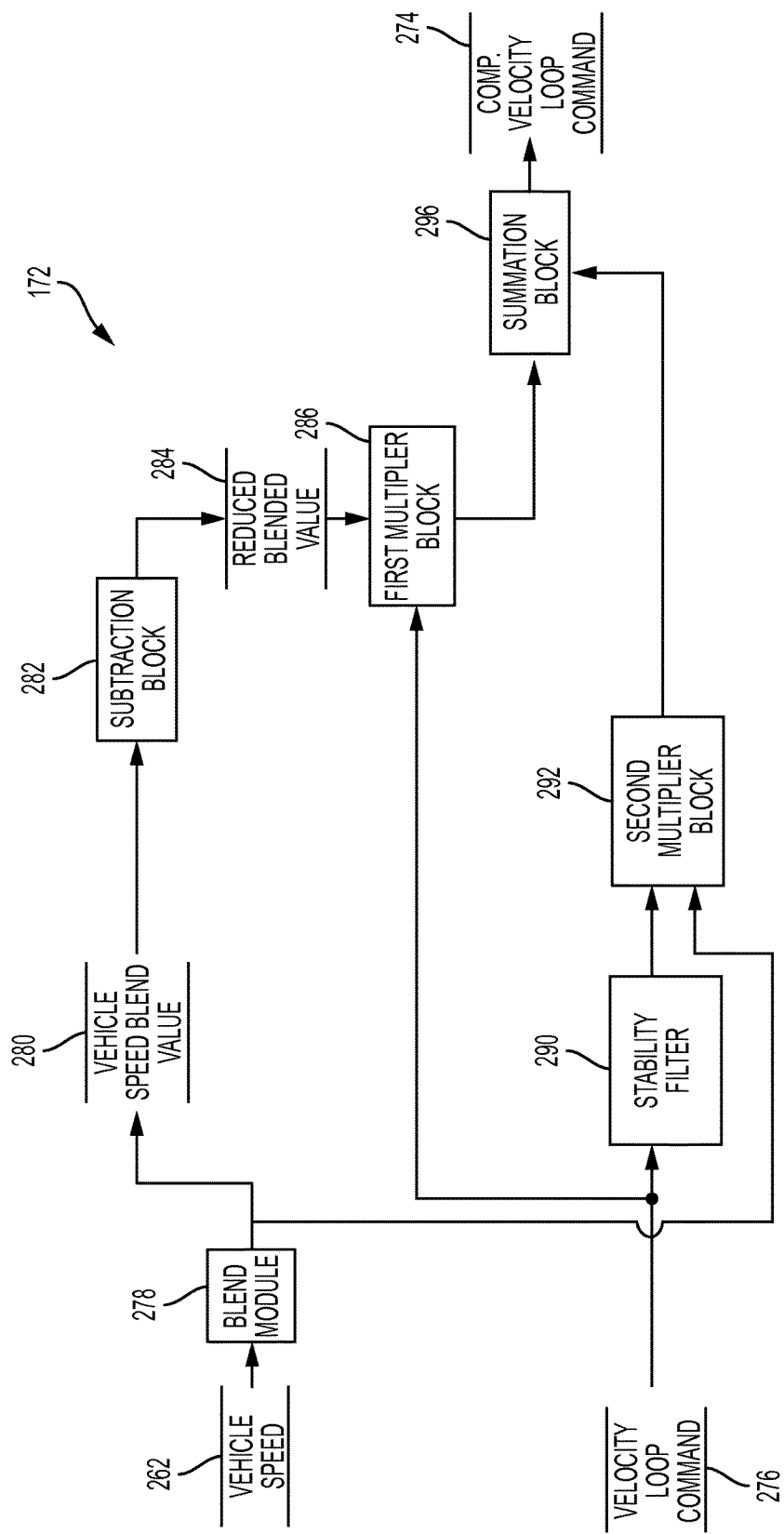
FIG. 5 is a block diagram of a stability compensation filter in accordance with one embodiment of the invention.

Specifically, FIG. 5 is an exemplary illustration of the stability compensation filter module 172. A blend module 278 with a factor blend table converts a vehicle speed 262 into a vehicle speed blend value 280. In one embodiment, the vehicle speed blend value 280 is a non-linear representation of the vehicle speed 262, and may be determined by tuned values present in a factor blend table of the blend module 278. In one embodiment, the vehicle speed blend value 280 is a value between 0 and 1.

The vehicle speed blend value 280 is sent to a subtraction block 282. The subtraction block 282 receives the vehicle speed blend value 280 as an input. In one embodiment, the vehicle speed blend value 280 is subtracted from a constant equal to 1, to form a reduced blended speed value 284. The reduced blended speed value 284 is sent to a first multiplier block 286. The first multiplier block 286 multiplies the reduced blended speed value 284 by the velocity loop command, 276. The output of the first multiplier block 286 is sent to summation block 296.

A stability filter 290 receives the velocity loop command 276 as an input and compensates the velocity loop command 276. The compensation provided by the stability filter 290 may be provided by a second order equation within a discrete filter (e.g. second order filter). The continuous-time transfer function for this filter can be represented by:

$$\frac{s^2 + 2 \cdot \zeta \cdot \omega_n + \omega_n^2}{(s + p_1) \cdot (s + p_2)} \cdot \frac{p_1 \cdot p_2}{\omega_n^2},$$

as detailed in U.S. Pat. No. 5,668,722 "Electric Power Steering Control," which is incorporated by reference herein. However, it is understood that other types of filters may be used as well. The compensation increases stability margins of a velocity loop, while maintaining steering feel. As described in more detail below, the stability filter 290 provides inertia compensation while maintaining desirable velocity loop stability margins.

An output of the stability filter 290 is multiplied with the vehicle speed blend value 280 at a second multiplier block 292. The output of second block 292 is sent to summation block 296, where the output of second block 292 is summed with the reduced filtered inertia command 288 to generate the compensated velocity loop command 274.

Figure 6:
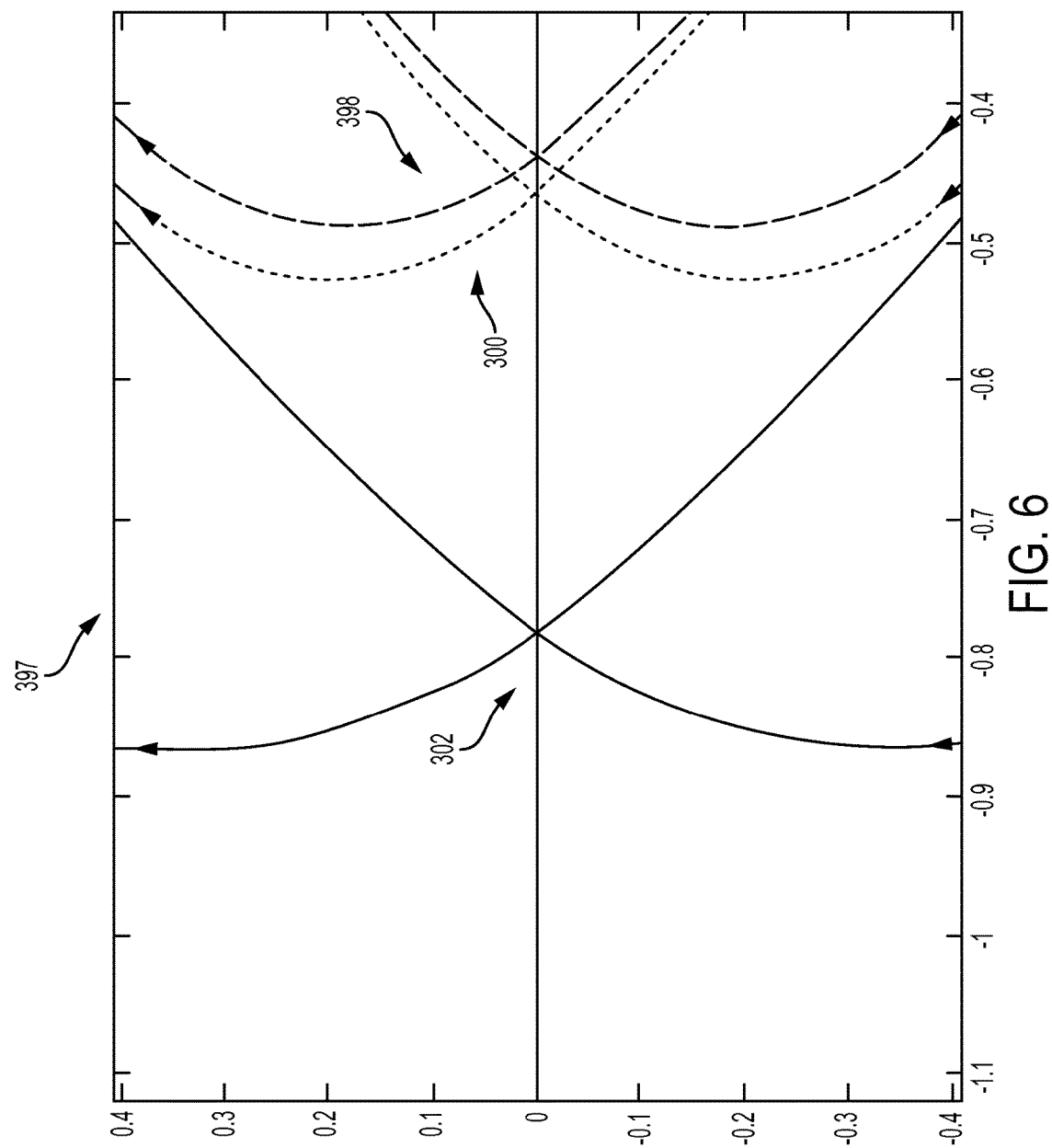
FIG. 6 is a Nyquist plot of a velocity open loop control in accordance with one embodiment of the invention.

FIG. 6 illustrates a Nyquist plot 397 of a velocity open loop of the EPS system. A baseline tuning set 398 illustrates a minimum level of stability required of a velocity loop. A tuning set 300 illustrates a tuning set with some gain applied to tuning set 302 but without stability compensation applied. As shown, values approaching a −1 value on the x-axis illustrate a tuning set with less stability margin. Hence, applying a gain value to the command without any compensation lead to decreased stability margin in this example. Filtered tuning set 306 represents a velocity open loop plot for a tuning with stability compensation filter module applied. Specifically, the filtered tuning set 302 as shown, represents an increased stability of the velocity open loop compared to the option of tuning set 300, while maintaining stability margin values similar to the baseline tuning set 398.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a power steering system comprising:
   a motor;
   a control module in communication with the motor, the control module providing a compensated velocity loop command to the motor, the control module including:
   a stability compensation filter module that receives a vehicle speed and a velocity loop command, the stability compensation filter applies a second order filter on the velocity loop command to generate the compensated velocity loop command used by the motor.

2. The system of claim 1, wherein the stability compensation filter module includes a blend module, the blend module generates a vehicle speed blend value from a look-up table.

3. The system of claim 2, wherein the vehicle speed blend value is subtracted from a constant to generate a reduced blended value.

4. The system of claim 2, wherein the velocity loop command represents an inertia compensation command, wherein a reduced blended value based on the vehicle speed is multiplied with the inertia compensation command to generate a first output, the compensated velocity loop command is based at least in part on the first output.

5. The system of claim 2, wherein the stability compensation filter applies a second order filter to generate the compensated velocity loop command.

6. The system of claim 5, wherein the compensated velocity loop command is based at least in part on a product of the reduced blended value and the velocity loop command.

7. The system of claim 5, wherein the vehicle speed blend value is a non-linear representation of the vehicle speed.

8. A method for controlling a power steering system comprising:
   receiving a vehicle speed and velocity loop command based on a velocity of a motor;
   filtering the velocity loop command with a second order filter; and
   generating a compensated velocity loop command used by the motor based on the filtered velocity loop command.

9. The method of claim 8, further comprising generating a vehicle speed blend value from a look-up table.

10. The method of claim 9, wherein the vehicle speed blend value is subtracted from a constant to generate a reduced blended value.

11. The method of claim 9, wherein the velocity loop command represents an inertia compensation command, wherein a reduced blended value based on the vehicle speed is multiplied with the inertia compensation command to generate a first output, the compensated velocity loop command is based at least in part on the first output.

12. The method of claim 9, wherein the filtering includes applying a second order filter to generate the velocity loop command.

13. The method of claim 12, wherein the compensated velocity loop command is based at least in part on a product of the reduced blended value and the velocity loop command.

14. The method of claim 12, wherein the vehicle speed blend value is a non-linear representation of the vehicle speed.

15. A vehicle including a control system for a power steering system, the power steering system comprising:
   a motor;
   a control module in communication with the motor, the control module providing a compensated velocity loop command to the motor, the control module including:
   a stability compensation filter module that receives a vehicle speed and a velocity loop command, the stability compensation filter applies a second order filter on the velocity loop command to generate the compensated velocity loop command used by the motor.

16. The system of claim 15, wherein the stability compensation filter module includes a blend module, the blend module generates a vehicle speed blend value from a look-up table.

17. The system of claim 16, wherein the vehicle speed blend value is subtracted from a constant to generate a reduced blended value.

18. The system of claim 16, wherein the velocity loop command represents an inertia compensation command, wherein a reduced blended value based on the vehicle speed is multiplied with the inertia compensation command to generate a first output, the compensated velocity loop command is based at least in part on the first output.

19. The system of claim 16, wherein the stability compensation filter applies a second order filter to generate the compensated velocity loop command.

20. The system of claim 19, wherein the compensated velocity loop command is based at least in part on a product of the reduced blended value and the velocity loop command.

* * * * *